United States Patent Office 2,894,898
Patented July 14, 1959

2,894,898

METHOD OF TREATING HYDROCARBONS WITH AN ALUMINA CONTAINING CATALYST COMPOSITE

Willi Oettinger and Wilhelm von Fuener, Ludwigshafen (Rhine), and Otto Goehre, Heidelberg, Germany, assignors to Badische Anilin- & Soda-Fabrik Aktiengesellschaft, Ludwigshafen (Rhine), Germany No Drawing. Application May 2, 1955
Serial No. 505,538

Claims priority, application Germany May 7, 1954

6 Claims. (Cl. 208—112)

In its general aspect this invention relates to an improved method of treating hydrocarbons in the presence of hydrogen.

More specifically it relates to the production of an alumina-base catalyst for the treatment of hydrocarbons in the presence of hydrogen.

It has already been known to use, for the pressure hydrogenation of hydrocarbons as well as the dehydrogeneration, reforming, isomerization, refining and cracking in the presence of hydrogen, preferably under pressure, in particular in the gas phase, at temperatures of 200° to 600° C., catalysts which consist of alumina and are provided with small amounts of substances having catalytic activity.

We have now found and this is the object of our invention that a catalyst having particularly high efficiency in reactions of the aforesaid type can be obtained by using an alumina prepared by rapidly and intimately mixing an aluminate solution with an acid precipitant. In the practice of our invention the precipitant is added rapidly to the aluminate solution in one portion with intimate mixing in such an amount that the whole of the aluminum hydroxide precipitates immediately. One preferred embodiment of our invention consists in bringing together a flowing aluminate solution and a flowing precipitant with simultaneous intimate mixing, preferably at raised temperature. Care should be taken lest the precipitated aluminum hydroxide comes into contact with the initial substances in order to prevent further hydroxide from being precipitated on the aluminum hydroxide particles once they have been formed. The aluminum hydroxide is then washed, dried and heated, if desired after any liquid present has been separated.

For example the precipitation may be effected in a nozzle which is preferably of conical shape and formed with double walls. One stream flows through the inner opening and the other stream through the outer jacket. The two streams leave at the front opening, as for example the point of the cone. By their striking together there is formed a precipitate which is led away so that it has no opportunity of encountering the initial solutions. Thus the precipitation chamber consists solely of the nozzle opening. It is also possible to bring together the ends of two pipes through which the solutions flow, so closely, for example at an angle of 15° to 180° C., that the effluent solutions come into intimate contact and a precipitation takes place immediately. A short tube, having a short mixing region, can also be used, the product produced leaving the short tube immediately after its formation. Injectors can also be used, the one solution being passed through the central tube and the effluent stream entraining the other solution. The vessel in which the injector is situated is kept so small that the aluminum hydroxide precipitated leaves the vessel very rapidly. Turbo-mixers, such as have been proposed for the production of emulsions, are also especially well suited for the purpose. The precipitation in this case is carried out at a pH value between 4 and 8.

The acid precipitant may be gaseous, as for example carbon dioxide, or liquid, as for example hydrochloric acid, sulfuric acid, nitric acid or sodium bicarbonate solution. When using a gaseous precipitant, the aluminate solution is led through the reaction vessel in co-current or counter-current with the precipitant. The vessel may consist of a vertical cylindrical tower or tubular furnace provided with cooling means in order that the reaction temperature may be accurately controlled. The coolant is led through the tubes of the tubular furnace in co- or counter-current to the aluminate solution. The reaction temperature in general amounts to about 20° to 60° C. The precipitated aluminum oxide is continuously removed from the reaction chamber. The aluminate solution preferably flows downwards so that the precipitated product can be continuously withdrawn at the bottom of the reaction vessel, and then immediately freed from the liquid by filtration or centrifuging and quickly washed or supplied to a collection vessel from which it is periodically withdrawn.

The same apparatus can also be employed when using liquid acid. It is of special advantage to use the said modifications in which the two liquids, namely the aluminate solution and the acid, are led together through pipes so closely that the effluent liquids immediately mix and precipitation occurs. For the purpose of cooling, cold water may if desired be sprayed in during the precipitation. The said precipitation can also be carried out in a multi-walled nozzle through which the separate liquids and if desired water flow. Injectors, short mixing paths or mixers can also be used which are arranged in vessels which if desired may be provided with cooling means. The precipitated aluminum hydroxide is continuously withdrawn from the vessels.

With the aid of the apparatus above described, the precipitation can be carried out very rapidly and the precipitate formed can also be withdrawn after the shortest possible residence time in the reaction vessel. For catalytic action it is of special importance that the rapidly precipitated gel particles are not further increased in size by the flowing solutions of the initial materials, such as is the case for example in a conventional precipitation vessel where in the presence of the primary particles first formed newly precipitated aluminum hydroxide is always being deposited as a layer around the primary particles so that the particles have time to change in their structure. Therefore when working according to the present invention the vessels are preferably kept as small as possible so that the particles of the precipitated product do not come into contact again with the initial materials. As far as possible, the particles of aluminum hydroxide should also not be left for too long in a collecting vessel. A rapid working up, or a marked change in temperature in the collecting vessel as compared with the precipitation temperature is recommended.

The precipitate can be stirred several times with water, filtered and again washed until practically no acid is contained therein. The precipitated product obtained from aluminate solution is similarly separated from the liquid and washed. As the washing agent there is used hot water and/or hot water acidified with acid, as for example carbonic acid. In the case of excess of acid, the acid is removed by washing with ammoniacal water. The precipitate can be stirred with water one or more times, acid added and if desired ammonia mixed therewith so that a pH value between about 4 and 11 is set up. The addition of ammonia and acid during washing depends entirely on the desired pH value of the precipitate. The mixture is then filtered and if desired washed with water. It is good practice to carry out a washing also after heating to 400° and above, for example to 500° C.

It is especially preferred not to filter the pasty precipitate formed by the precipitation, but to heat it previously for some time, as for example ½ to 2 hours, at about 100° C. The product can also be heated under pressure, for example at 2 to 30 atmospheres or more. The moisture is removed by releasing the pressure and the product removed from the pressure vessel.

The washed alumina can then be introduced into a conventional catalyst carrier mould, as for example supplied to an extrustion press or pill press, in order to impart thereto the shape, for example, of small pills. The product may, however, also be converted into the granulated condition. By spraying the pasty product, the alumina can be given the form of small beads.

After shaping, it is preferably first dried for one or more hours, as for example 2 to 8 hours, at 80° to 100° C. and then at 120° to 200° or 250° C. for 1 to 5 hours. Then the temperature is raised to 350° to 450° C. for several hours, as for example 2 to 15 hours. The calcination temperature usually lies still higher, as for example 450 to 600° C. and is carried out for 2 to 10 hours.

The carrier is advantageously treated with gases, such as ammonia, hydrogen, sulfur dioxide, halogen or inert gases, and the gas can remain in the pores. The carrier can also be pretreated with hydrogen halide or an inorganic or low molecular weight organic monobasic or dibasic acid. There may be mentioned for example hydrogen chloride, hydrogen fluoride or chlorsulfonic acid, formic acid or oxalic acid. The carrier can absorb halogen or merely be etched therewith. Part, as for example 2 to 10%, of the alumina can be brought into solution with acid or an acid salt solution, and the resultant paste can then be shaped and heated. The paste can also be produced by the addition, for example, of an aluminum salt solution, such as aluminum chloride solution.

The advantage of the alumina carrier thus obtained consists in the facts that it has a high bulk density, a large inner surface and large pore volume and renders the finished catalyst very active.

For the preparation of the catalyst, the carrier prepared by one of the methods described is impregnated with a solution of one or more compounds of metals of the 5th to 7th groups of the periodic system as well as the iron, platinum and palladium groups, as well as the heavy metals of the 1st group, such as copper, silver and gold, and also zinc, magnesium, cadmium, zirconium, titanium, tin, lead, antimony and bismuth. By heating to 100° to 300° C. for about 1 to 2 hours or more, the compound of the chosen metal is decomposed. Then the catalyst is heated for several hours at 400° to 600° C. The corresponding metal or metal oxide is then present on the carrier. By aftertreatment with volatile sulfur or halogen compounds, preferably under pressure, the sulfides or halides can be prepared.

For the catalytic reactions above described, there may be mentioned especially the compounds, as for example the oxides, sulfides, selenides, tellurides, borates, nitrates, carbonates, halides, phosphorus compounds or also silicates of vanadium, molybdenum, tungsten, chromium, uranium, rhenium, iron, nickel or cobalt as well as gold, silver, copper, tin, titanium, lead, zinc and manganese as well as metals of the platinum, palladium and iron groups and the heavy metals of the 1st group or mixtures of these. Thus the said compounds of molybdenum, tungsten, chromium and vanadium can be used in admixture or in chemical combination with compounds of nickel, cobalt, titanium, tin or lead and/or with the metals of the platinum and palladium group and/or heavy metals of the 1st group and their compounds, the added substances preferably being used in smaller amounts than the molybdenum, tungsten, chromium and vanadium.

Some elements are suitable as promotors for the most common catalysts of the 5th to 8th groups of the periodic system, as for example gold, silver, mercury, titanium, copper, zinc, tin and uranium and lead or their compounds. Mixtures consisting of the compounds of the said metals of the 4th group of the periodic system, as for example titanium, with the compounds of iron, nickel, cobalt or manganese as well as those of copper, silver, gold, platinum, palladium, ruthenium or their compounds are also suitable. There may also be mentioned the compounds of the metals of the iron group in admixture with platinum, palladium, ruthenium, copper, silver, gold or their compounds. These mixtures can also be present in the form of chemical compounds. The activity of the catalysts can be adjusted with compounds of the alkali and alkaline earth metals, because these influence the activity. The said metals and metal compounds can also be added before the shaping of the alumina by mixing the two components in a mixer, kneader or a ball mill and then drying and calcining them. The finished catalyst contains as a rule 1 to 30% or more of the abovementioned metals.

It is also possible, during the precipitation of the alumina from the aluminate solution and the precipitant, to add continuously a second metal salt solution of one of the abovementioned metals so that a product is precipitated in which the metal is combined with the alumina. However silicic acid, silicates, bleaching earths, graphite or gels, such as silica gel, titania gel or iron gel, can also be added. A waterglass solution can also be introduced, so that during the preparation of the alumina, silicic acid is also precipitated. In some cases it may be advantageous for the alumina to contain 1 to 30%, in particular 3 to 20%, of silicic acid or silicates. These aluminas can also serve as carriers.

The catalyst can then be used according to this invention for the cracking, refining or aromatising pressure hydrogenation of hydrocarbons. As initial materials there may be used petroleums, tars, shale oils and their fractions, and also cracking, hydrogenation and extraction products, in particular gasolines and middle oils, as well as the reduction products of carbon monoxide and polymerization products of olefines.

By pressure hydrogenation we mean the treatment of the said initial materials with hydrogen or gases containing hydrogen, such as illuminating gas, coke oven gas, cracking gas or low temperature carbonization gas, at temperatures of about 200° to 600° C. and under high pressures of 150 to 1000 atmospheres, in particular 200 to 700 atmospheres, or low pressures of 5 to 150 atmospheres, as for example 10 to 120 atmospheres, advantageously 10 to 70 atmospheres. Amounts of 50 to 5000 litres, as for example 100, 250, 300, 500, 700, 1000 or 2000 litres, of hydrogen per kilo of initial material per hour and throughputs of 0.1 to about 10 parts by volume of initial material for each part by volume of reaction space per hour are chosen.

The initial material can be allowed to trickle down through a reaction vessel in the form of a tower which is filled with pieced catalyst. The gas containing hydrogen can be led in co-current with or counter-current to the initial material. The initial material can also be moved through the reaction vessel upwardly with the hydrogenation gas. The hydrogenation gas can also be introduced at various points of the reaction vessel. The catalyst can also be arranged on sieves in stories in the vessel so that spaces free from catalyst are present between the stories in which the supply pipes for the initial material and hydrogenation gas open.

The catalyst can also be used for improving gasolines or middle oils, for example for increasing the octane rating, by reforming in the presence of hydrogen, dehydrogenation of naphthenes, cyclization of paraffinic hydrocarbons, removal of sulfur, oxygen and/or nitrogen compounds and isomerization of paraffinic hydrocarbons, lower pressures, as for example 2 to 70, in particular 5 to 50, as for example 7 to 20 or 40, atmospheres, and temperatures of 250° to 500° C., in particular 330° to 450° C. being used. In this case also the abovementioned metals, metal compounds or mixtures, as for example the oxides of the metals of the 5th and 6th groups as well as the metals of the platinum and palladium groups as well as copper, silver, gold and titanium and their compounds or mixtures of these with platinum or palladium can similarly be used. In this way it is also possible to split off, for example, OH or $NH_2$ groups from compounds containing oxygen, sulfur or nitrogen or side chains, as for example alkyl groups, from cyclic compounds. In the case of reforming, dehydrogenation, dealkylation, cyclization and refining, less hydrogen may be used; it is sufficient to return the hydrogen formed during the process, for example in an amount of 100 to 1000 litres per kilogram per hour, without adding extraneous hydrogen. The isomerization or alkylation of hydrocarbons and the cracking of oils and fractions of the same in the presence of hydrogen under slightly increased pressure can also be advantageously carried out with the said catalysts. The said reactions can also be carried out in two or more reaction vessels which are arranged one behind another, preferably with increasing temperature. The volumes of catalyst can be different in the individual vessels and may, for example, increase or decrease. The amount of hydrogen can also be different in the individual vessels. It is possible to work with increasing or decreasing amounts of hydrogen. Part of the product obtained can also be separated between the individual vessels.

When working under pressures up to about 150 atmospheres, the catalyst is generally speaking reactivated from time to time with a gas containing oxygen at temperatures of 450° to 600° C. The catalyst or the catalyst carrier can also be exposed to a temperature above 400° C., as for example 500° to 600° C., for a long time before use.

The catalysts can be arranged rigidly in the reaction chamber in known manner. They can also be present in the reaction chamber in a moving state. The catalyst is also suitable for the reduction of carbon monoxide, hydrogenation of olefines and nitro groups and the polymerization of olefines.

The following examples will further illustrate this invention but the invention is not restricted to these examples.

*Example*

A sodium aluminate solution, which contains 90 grams of $Al_2O_3$ per litre of solution, is led through the central bore of a double-walled nozzle. Through the outer annular chamber of this nozzle there is supplied a dilute hydrochloric acid. The amount of acid is determined by a preliminary test so that the mixture of the two solutions shall have a pH value of 6.

When the two solutions meet at the apex of the conical nozzle, precipitation occurs. A precipitation temperature of 25° C. is maintained. The precipitate is discharged continuously, filtered and washed first with hot water and then with acidulated water, for instance water containing carbon dioxide. It is advantageous then to make it into a paste with water and boil it up for an hour while stirring. The mixture is then filtered and washed with warm acidulated water until it is free from alkali. The precipitate is dried at room temperature and then for 1–5 hours at a temperature of between 130° and 250° C., for example at a temperature of 170° C. The powder is made into a paste with a small amount of an acid, for example with 3% of nitric acid of 50% strength, the paste shaped in an extrusion press, heated for an hour at 50° to 100° C., then for 1–6 hours at 200°–250° C. and finally for 1–3 hours at 450° C. It is good practice to again wash the pills with ammoniacal water and to heat them to 400° for several hours, for example 5 hours. Calcining occurs by heating at 450°–500° C. for 1–6 hours.

The alumina is then impregnated with ammonium molybdate, dried at 150° C. during 2 hours and then heated for 3 hours at 450° C. The catalyst contains 12% of $MoO_3$.

Using this catalyst, a middle oil with 1.6% of sulfur and 0.16% of nitrogen arising in the pressure hydrogenation of a crude oil is led at 50 atmospheres with 1 cubic metre of hydrogen per kilogram of middle oil at 325° C. over the catalyst.

The throughput is 1 kilogram of middle oil to each liter of catalyst per hour. The middle oil obtained contains only 0.14% of sulfur and 0.005% of nitrogen. The catalyst can also be used to advantage for the hydroforming process.

The alumina prepared in the aforesaid manner can also be impregnated with cobalt molybdate or nickel sulfide-tungsten sulfide and the catalyst so prepared used for desulfurizing benzene, gasoline or kerosine at a temperature of 380° to 450° C. and a pressure of 3 to 40 atmospheres, the hydrogen being either fed extraneously or formed from the starting material during the reaction and led in a cycle.

When this alumina is impregnated with 1.3% of palladium cyclohexane is led over the catalyst so prepared together with 1.7 m.³ of hydrogen to one kilogram of cyclohexane at a temperature of 470° C. and a pressure of 25 atmospheres, benzene is obtained in a yield of 85%.

When the same alumina impregnated with 10% of nickel sulfide and tungsten sulfide is used as a catalyst and cyclohexane is led over in a proportion of 1 volume to each volume of catalyst per hour, together with 1.5 m.³ of hydrogen to 1 kilogram of cyclohexane at a temperature of 405° C. and a pressure of 180 atmospheres, a reaction product is obtained which consists of methylcyclopentane to the extent of 60%.

The alumina can be used as a catalyst carrier for the isomerization of paraffin-base gasoline, naphthene-base gasoline or cracked gasoline, the catalytically active component being an oxide of molybdenum, vanadium, chromium or a metal halide, as for example an alkaline-earth halide, aluminum halide and antimony and/or titanium halide, to which alkali metal halides may be added, or a phosphorus halide.

We claim:

1. A process for carrying out hydrocarbon reactions with hydrogen, at temperatures of 200 to 600° C., in the presence of a member from the group consisting of catalytically active metals and metal compounds which are applied to alumina as a carrier wherein the catalyst carrier has been prepared by quickly and intimately mixing an aluminate solution with an acid precipitant, the quantity of the precipitant added to the aluminate solution being such that the whole of aluminum hydroxide is precipitated immediately, the precipitated aluminum hydroxide is removed from the precipitation zone as rapidly as it is formed to avoid further contact of the precipitated aluminum hydroxide with additional quantities of the reactants in the precipitation zone, and the precipitated aluminum hydroxide is heated for at least about one-half hour at about 100° C.

2. A process for carrying out hydrocarbon reactions with hydrogen, at temperatures of 200 to 600° C., in the presence of a member from the group consisting of catalytically active metals or metal compounds which are applied to alumina as a carrier wherein the catalyst carrier has been prepared by bringing together a flowing aluminate solution with a flowing precipitant with intimate mixing, the precipitated aluminum hydroxide is removed from the precipitation zone as rapidly as it is formed to avoid further contact of the precipitated aluminum hydroxide with additional quantities of the reactants in the precipitation zone, and the pasty precipitated aluminum hydroxide is heated for at least about one-half hour at about 100° C.

3. A process as claimed in claim 2 wherein the precipitation is carried out at a pH of between 4 and 8.

4. A process as claimed in claim 2 wherein the catalyst carrier, after having been prepared from an aluminate solution according to the process of claim 2, is then washed, dried and heated to a temperature of 400°–500° C., is again washed with ammoniacal water, dried and further heated to a temperature of between 400° and 600° C.

5. A process as claimed in claim 2 wherein the catalyst carrier used is provided with from 0.1 to 30% of at least one heavy metal of the 1st to the 8th groups of the periodic system.

6. A process as claimed in claim 2 wherein the catalyst carrier used is provided with from 0.1 to 30% of at least one compound of a heavy metal of the 1st to 8th groups of the periodic system.

References Cited in the file of this patent

UNITED STATES PATENTS

| | | |
|---|---|---|
| 2,412,600 | Burk et al. | Dec. 17, 1946 |
| 2,657,115 | Ashley | Oct. 27, 1953 |
| 2,667,404 | Haensel | Jan. 26, 1954 |
| 2,728,713 | Kearby et al. | Dec. 27, 1955 |